(12) United States Patent
Zhang et al.

(10) Patent No.: US 7,962,897 B2
(45) Date of Patent: Jun. 14, 2011

(54) DYNAMIC COMPUTER ARCHITECTURE

(75) Inventors: Rui Zhang, Beijing (CN); Yujun Zhang, Beijing (CN)

(73) Assignee: Honeywell International Inc., Morristown, NJ (US)

( * ) Notice: Subject to any disclaimer, the term of this patent is extended or adjusted under 35 U.S.C. 154(b) by 1261 days.

(21) Appl. No.: 11/590,439

(22) Filed: Oct. 31, 2006

(65) Prior Publication Data

US 2007/0240130 A1 Oct. 11, 2007

(51) Int. Cl.
*G06F 9/44* (2006.01)
(52) U.S. Cl. ......... 717/121; 717/106; 717/108; 717/114
(58) Field of Classification Search ........................... None
See application file for complete search history.

(56) References Cited

U.S. PATENT DOCUMENTS

| 6,083,276 A * | 7/2000 | Davidson et al. | 717/107 |
| 6,289,462 B1 * | 9/2001 | McNabb et al. | 726/21 |
| 7,584,451 B2 * | 9/2009 | Iborra et al. | 717/101 |
| 2002/0147749 A1 * | 10/2002 | Ortiz et al. | 707/523 |
| 2006/0041522 A1 * | 2/2006 | Rodriguez-Rivera | 707/1 |

OTHER PUBLICATIONS

Eric M. Dashofy, "A Highly-Extensible, XML-Based Architecture Description Lanaguage", May 19-25, 2001, pp. 103-112.*
Eric M. Dashofy, "An Infrastruture for the Rapid Development of XML-based Architecture Description Languages", May 19-25, 2002, pp. 266-276.*

* cited by examiner

*Primary Examiner* — Tuan Q Dam
*Assistant Examiner* — Isaac T Tecklu
(74) *Attorney, Agent, or Firm* — Schwegman, Lundberg, and Woessner, P.A.

(57) ABSTRACT

A process assembles and/or reassembles a software application. In an embodiment, assemblies are loaded from an architecture description markup language (ADML) document. Class objects and type objects are activated based on the ADML document. Components and connectors are created based on the ADML document. The components are serialized, and an architecture is assembled based on connections described in the ADML document. A main active component designated in the ADML document is then activated.

17 Claims, 7 Drawing Sheets

DYNAMIC COMPUTER ARCHITECTURE

RELATED APPLICATIONS

This application claims priority under 35 U.S.C. 119 to Chinese Patent Application No. 2006100934295, filed Jul. 4, 2006, which application is incorporated herein by reference and made a part hereof.

TECHNICAL FIELD

Various embodiments relate to software architecture, and in an embodiment, but not by way of limitation, a software architecture that may be re-designed and re-constructed at runtime.

BACKGROUND

With current technology, it takes a tremendous amount of a business's resources to develop any non-trivial computer-based system. Such endeavors may include brainstorming, initial designs, design reviews, coding, testing, beta-testing, and rollout. However, even if the system is error and bug free, and meets all of the original system requirements, it may turn out that the system is not as useful as originally anticipated. One reason for this shortcoming may be the fact that the business environment is constantly changing, and the system that was needed just a few months ago may not be the system that is presently needed. Moreover, to change such a system to meet current needs would take a great deal of effort, and even if the effort was expended, there is no guarantee that the revamped product would meet the current specifications, or even if it did, how long it would remain a useful product. The art would therefore benefit from a technology that would permit the easy redesign of computer systems without the vast expenditure of resources that it presently takes to do so.

SUMMARY

Figure 1:
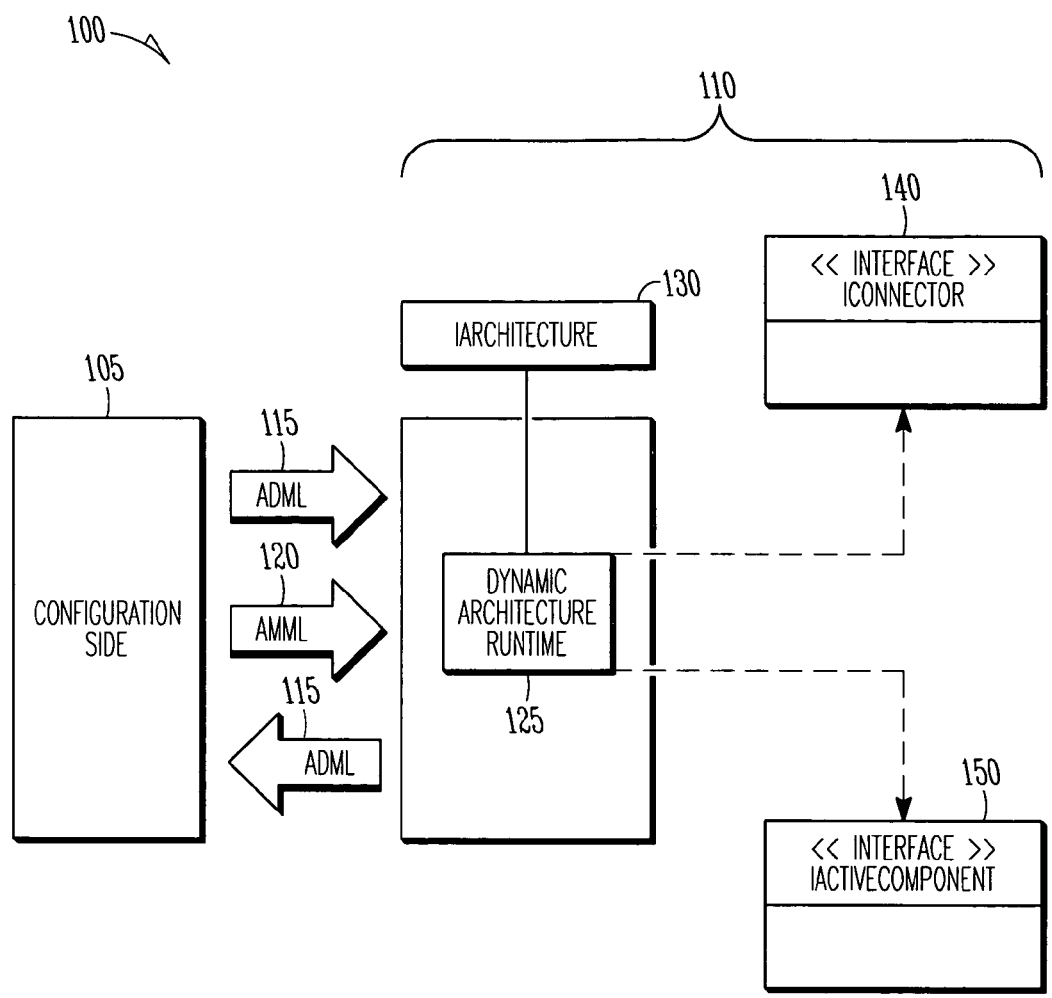
FIG. 1 illustrates an example embodiment of a dynamic architecture.

In an embodiment, a process to assemble a software application includes configuring a processor to load assemblies from an Architecture Description Markup Language (ADML) document. The processor is then configured to activate class objects and type objects based on the ADML document. The processor is further configured to create components and connectors based on the ADML document and to serialize the components. Finally, the processor is configured to assemble an architecture based on connections described in the ADML document and to activate a main active component designated in the ADML document.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

One or more embodiments of the present disclosure provide a dynamic system architecture that allows for less resource intensive redesign of software and reconstruction of system architecture. Consequently, systems may be more easily updated to meet ever changing needs. Specifically, one or more embodiments provide for the ability to deploy software at runtime, the ability to configure and re-configure the system at runtime, minimize the configuration and reconfiguration of the application, provide dynamic software resource management, provide the software system with the ability to adapt at runtime, minimize software maintenance effort, and provide a high rate of availability, fault tolerance, and error recovery at runtime.

One or more embodiments of the present disclosure accomplish these features by providing an open and light weight dynamic architecture system. In this case, the term open means allowing persons to extend the system. The term light weight means that such systems use few resources. This open and light weight architecture system is implemented with two newly developed XML-based languages. One is referred to as an Architecture Description Markup Language (ADML), and it is used to serialize an architecture description. The other newly developed language is referred to as an Architecture Modification Markup Language (AMML), and it is used to serialize architecture modification.

An advantage of such a system is that there are very few constraints for these dynamic architecture applications. An application developer may reuse many off the shelf software components as components in the system, and may define connectors arbitrarily based on the application architecture. Moreover, very little extra memory is needed at run time for applications which are built using this dynamic architecture system. Consequently, embodiments are particularly suited for a resource limited computer system such as an "embedded system" like PDAs and mobile phones. The embodiments focus on the assembling of components at runtime.

An embodiment includes three main parts—the ADML and the AMML, the Dynamic Architecture Run-Time (DART), and the Interfaces. The ADML and the AMML define the document format that is used to serialize the architecture description and architecture modification. The DART is a software component/agent that is able to assemble and/or reassemble an application at run time based on the ADML and the AMML document. The DART is also able to provide an ADML document about a current running application. The three interfaces in this system include the IConnector, the IActiveComponent, and the IArchitecture. In an embodiment, the IConnector is implemented by the Connectors in the ADML and AMML files. When the DART assembles objects, it invokes the IConnector interface (See FIG. 1; No. 140) on the designated connector to build up connections that are described by the ADML. The IActiveComponent controls the execution of active objects in a current architecture. For example, during the reassembling of an application, the system should be paused, and after reassembly, execution continues per the IActiveComponent. The IArchitecture is simply another interface in the DART (See FIG. 1; No. 150). In an embodiment, DART is controlled by a program through this interface, and DART is built upon this interface. Moreover, since DART is also another component, multiple architectures may be assembled together.

FIG. 1 illustrates an example embodiment of a Dynamic Architecture Run Time (DART) system 100. In the DART system 100, a configuration side 105 communicates with an application side 110 via the ADML 115 and the AMML 120. The application side 110 includes a DART module 125, and its associated IArchitecture 130, IConnector 140, and IActiveComponent 150.

An abbreviated example of an ADML document is as follows:

```
<?xml version "1.0">
<ADML name = "Demo">
    <Assemblies>
        <Assembly id="ass_0" uri="System.Windows.Forms" />
        <Assembly id="ass_2" uri=Co.DA.dll"/>
        <Assembly id="ass_3" uri=Co.DAControlsConnector.dll"/>
        < Assembly id="ass_4" uri=Co.DADemo.Page1.dll"/>
        < Assembly id="ass_5" uri=Co.DADemo.Page2.dll"/>
    </Assemblies>
    <Types>
        <Type id="TabControl"
name="System.Windows.Forms.TabControl"
            idrefAssembly="ass=0" />
        <Type id="DemoForm" name="System.Windows.Forms.Form"
            idrefAssembly="ass=0" />
        <Type id="ControlsConnector"name="Co.DA.ControlsConnector"
            idrefAssembly="ass=3" />
        <Type id="Page 1" name="Co.DA.Demo.Page1"
            idrefAssembly="ass=4" />
        <Type id="Page2" name="Co.DA.Demo.Page2"
            idrefAssembly="ass=5" />
    </Types>
    <Components>
        <Component id="mainform" idrefType="DemoForm"/>
        <Component id="tabcontrol" idrefType="TabControl"/>
        <Component id="tabpage1" idrefType="Page1"/>
        <Component id="tabpage2" idrefType="Page2"/>
    </Components>
    <Connectors>
        <Connector id="main_connector" idrefType="ControlsConnector"/>
        <Connector id="tab_connector" idrefType="ControlsConnector"/>
    </Connectors>
    <Connections>
        <Connection idref="tab_connector">
            <end1 idref="tabcontrol" />
            <end2 idref="tabpage1">
                <Location X="4" Y="4"/>
                <Size Width="232" Height="246" />
                <Text>Task1</Text>
            </end2>
            <end2 idref="tabpage2">
                <Location X="4" Y="4"/>
                <Size Width="232" Height="246" />
                <Text>Task2</Text>
            </end2>
        </Connection>
    </Connections>
</ADML>
```

An abbreviated example of an AMML document is as follows:

```
<?xml version "1.0">
<AMML name = "Demo">
    <Assemblies>
        <Assembly id="ass_0" uri="System.Windows.Forms" />
        <Assembly id="ass_2" uri=Co.DA.dll"/>
        <Assembly id="ass_3" uri=Co.DAControlsConnector.dll"/>
        < Assembly id="ass_4" uri=Co.DADemo.Page1.dll"/>
        < Assembly id="ass_5" uri=Co.DADemo.Page2.dll"/>
    </Assemblies>
    <Types>
        <Type id="TabControl"
name="System.Windows.Forms.TabControl"
            idrefAssembly="ass=0" />
        <Type id="art" name="Co.DA.ArchitectureRuntime"
            idrefAssembly="ass=2" />
        <Type id="DemoForm" name="System.Windows.Forms.Form"
            idrefAssembly="ass=0" />
        <Type id="ControlsConnector"name="Co.DA.ControlsConnector"
            idrefAssembly="ass=3" />
        <Type id="Page 1" name="Co.DA.Demo.Page1"
            idrefAssembly="ass=4" />
        <Type id="Page2" name="Co.DA.Demo.Page2"
            idrefAssembly="ass=5" />
    </Types>
```

-continued

```
<Components>
    <Component id="__DART__" idrefType="art"/>
    <Component id="mainform" idrefType="DemoForm"/>
    <Component id="tabcontrol" idrefType="TabControl"/>
    <Component id="tabpage1" idrefType="Page1"/>
    <Component id="tabpage2" idrefType="Page2"/>
</Components>
<Connectors>
    <Connector id="main_connector" idrefType="ControlsConnector"/>
    <Connector id="tab_connector" idrefType="ControlsConnector"/>
</Connectors>
<Commands>
    <Add idref="tabcontrol"/>
    <Add idref="tab_connector"/>
    <Add idref="tabpage1"/>
    <Add idref="tabpage2"/>
    <Connection idref="tab_connector">
        <end1 idref="tabcontrol" />
        <end2 idref="tabpage1">
            <Location X="4" Y="4"/>
            <Size Width="232" Height="246" />
            <Text>Task1</Text>
        </end2>
        <end2 idref="tabpage2">
            <Location X="4" Y="4"/>
            <Size Width="232" Height="246" />
            <Text>Task2</Text>
        </end2>
    </Connection>
</Commands>
</AMML>
```

As indicated in the example ADML above, the ADML primarily provides information about components, connectors, and connections. Connectors are components that implement the IConnector interface (See FIG. 1; No. 140). Each component, including a connector, corresponds to an object in an application at runtime. In an embodiment, connectors may connect multiple components. The connection information is described in a connection element in an ADML. The Assembly elements and Type elements provide information to load and unload components (including connectors). The Thread elements designate the active objects in the application.

The open and light weight dynamic architecture system of one or more embodiments results from several factors. In at least one embodiment, a person may extend the system by writing their own Connector and Active Component. This is done by implementing the interfaces IConnector and IActiveComponent. This then semantically defines the new connection. In at least one other embodiment, a person may extend the system by adding any XML items into the open elements component, connector and connection in the ADML/AMML definition. By combining this with the writing of their own Connector and Active Component, a person can add special connection parameters.

The light weight nature of one or more embodiments refers to the use of few resources by the embodiments. The use of few resources results from the fact that there is no runtime load. Specifically, unlike other dynamic architecture systems, there is no messaging service in one or more embodiments of the disclosed system. Additionally, there is very little extra memory used for the dynamic architecture capabilities of these embodiments. Specifically, in an embodiment, a system keeps only a name-component table in memory; a description on current architecture is stored in an external memory. Consequently, when a system would like to reassemble the components, the architecture description will be loaded and the name-component table will be used to build the architecture again in memory. After the assembling is finished, the new architecture description is stored in external memory and the architecture in memory is destroyed.

As previously disclosed, the ADML is used to serialize an architecture description, and the AMML is used to serialize an architecture modification. These languages are open for the serialization of components, connectors, and connections. Serialization means that the states of an object may be stored to an external memory. Specifically, states of the components and connectors may be put into corresponding XML elements. For example, if it is desired to assemble a form component with initial size and position attributes, the attributes may be added into the XML description as follows:

```
<Component id='mainform' <idrefType="Demoform"/>
<Size>300, 200</Size>
<Position>0</Position>
</Component>
```

The dynamic architecture system will pass these extra XML elements that are contained in the Component element to the mainform component. The component transfers the description into memory.

Figure 2:
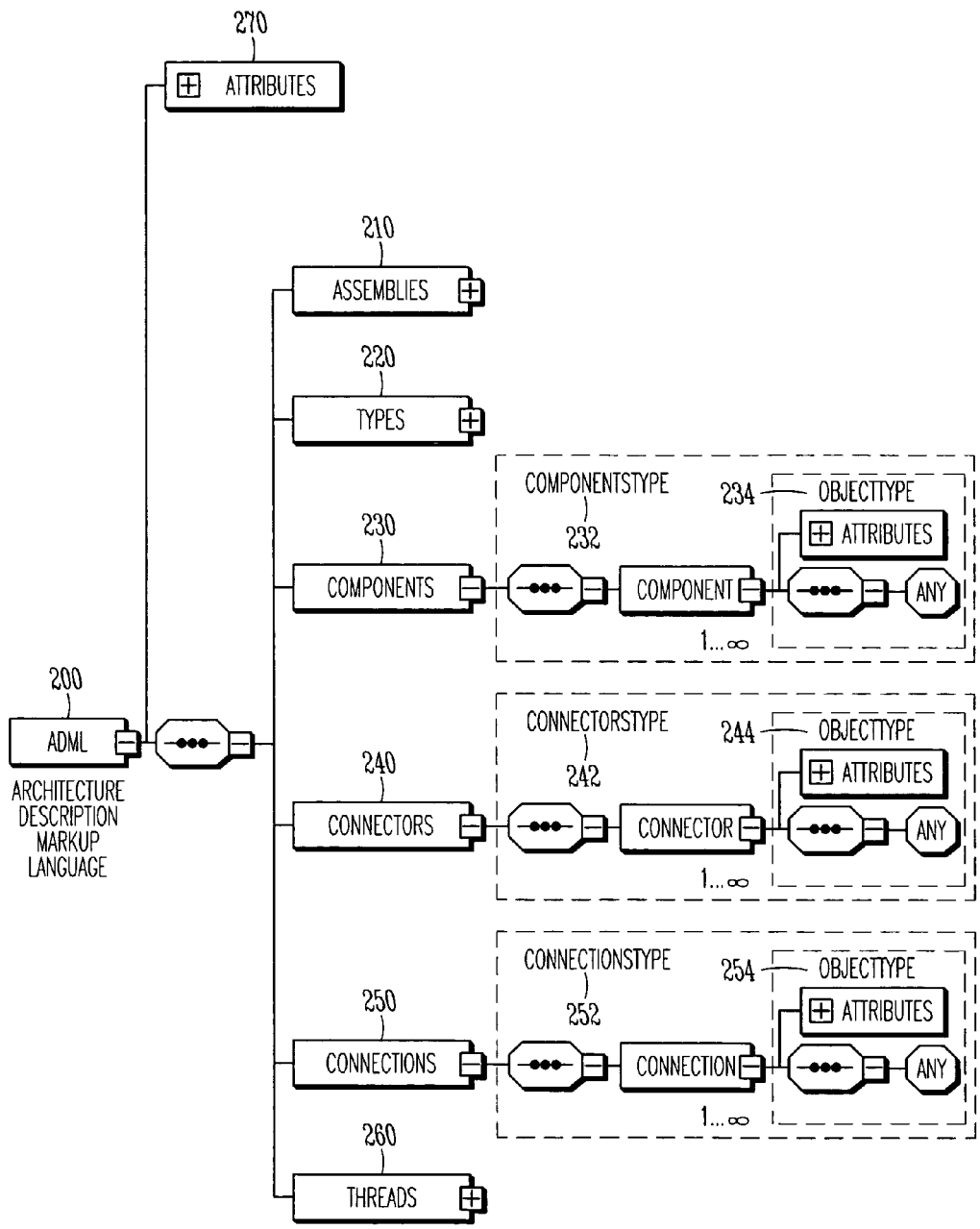
FIG. 2 illustrates an example embodiment of a structure of an Architecture Description Markup Language.
Figure 3:
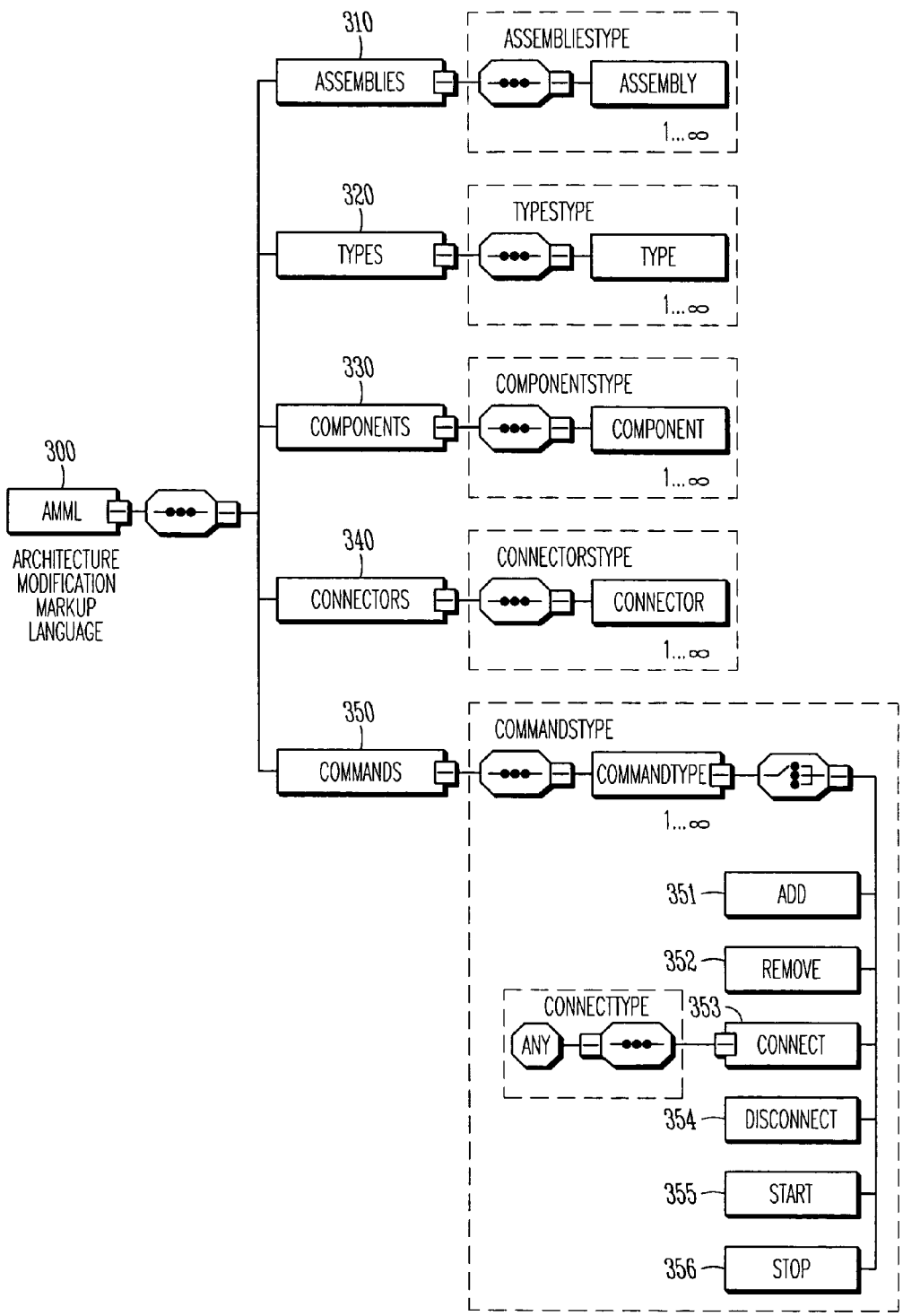
FIG. 3 illustrates an example embodiment of a structure of an Architecture Modification Markup Language.

FIGS. 2 and 3 illustrate the ADML and the AMML in a structural format. In particular, FIG. 2 illustrates an example ADML 200 and its associated assemblies 210, types 220, components 230, connectors 240, connections 250, threads 260, and attributes 270. The components 230 further include a components type 232 and a object type 234. Similarly, the connectors 240 include a connectors type 242 and an object type 244, and the connections 250 include a connections type 252 and an object type 254. FIG. 3 illustrates an example AMML 300, and its associated assemblies 310, types 320, components 330, connectors 340, and commands 350. In this embodiment of an AMML 300, the commands include Add 351, Remove 352, Connect 353, Disconnect 354, Start 355, and Stop 356.

An application built using an embodiment of the present disclosure may include assemblies, ADML or AMML documents and/or instances, and a DART. The Assemblies are software modules that contain the definition of components (including connectors). The ADML and AMML refer to the assemblies and the components defined in the assemblies. The DART is as described above.

In an embodiment, a system is built on a platform that is able to load and unload assemblies dynamically. For example, both Java and .Net platforms may be used to dynamically load and unload such assemblies. Specifically, in a Java platform, a class may be loaded/unloaded by creating a custom classloader and loading the class using it. By comparison, in the .Net platform, unloading can only be performed at the Application Domain level. In a COM platform, the COM conventions (such as Windows API LoadLibrary, FreeLibrary, GetProcAddress, and GetClassObject) may be used to load and unload a COM class dynamically. Additionally, a system may be built on a platform which is able to activate objects by string dynamically. With both Java and .Net platforms, a reflection mechanism is provided and it can be used to create objects according to the type name at runtime. The COM platform also provides an object activation mechanism (i.e., COM SCM—Service Control Manager) to create COM objects by class name or GUID at runtime.

In an embodiment, a system may be built upon a platform that provides a mechanism to arrange object lift-time. Since both Java and .Net platforms provide a garbage collection mechanism, there is not a need to arrange objects for unloading a corresponding class Oust use the garbage collection). For COM, the reference counting mechanism may be used to release objects.

Figure 4:
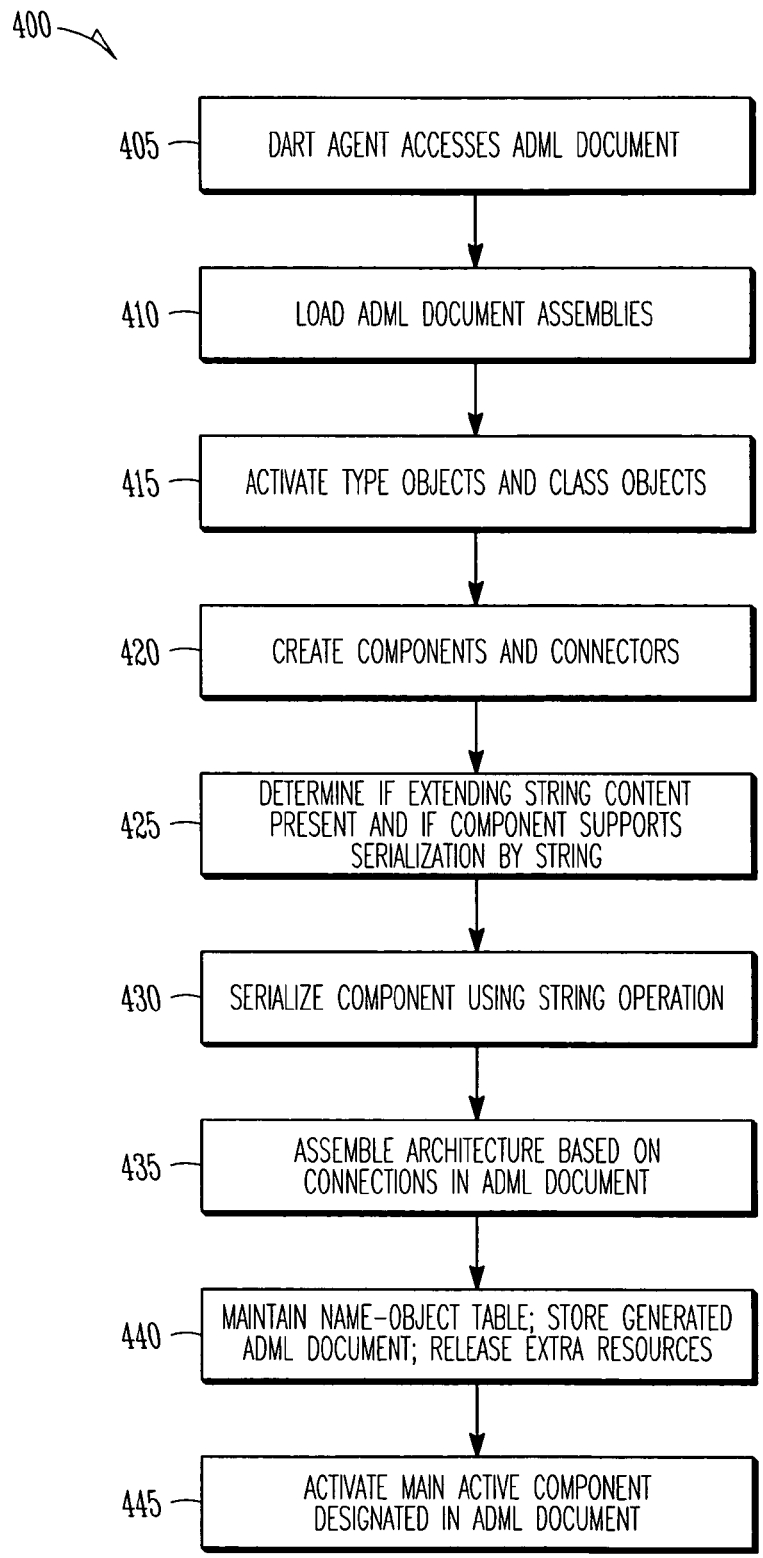
FIG. 4 illustrates an example embodiment of a process to build a system architecture.

FIG. 4 illustrates an embodiment of a process 400 to build a system architecture. In process 400, at operation 405, the DART agent accesses an ADML document. The DART agent reads the ADML document, and loads the assemblies that are referred to in the ADML document at operation 410. At operation 415, the DART agent activates the type objects and/or class objects based on the content of the ADML document. At operation 420, the DART agent creates the components and connectors based on the ADML document. The DART agent then determines at decision block 425 two conditions. First, DART determines if there are extending string content defined in the markup of the corresponding component markup. Second, DART determines if the component also supports serialization by string. If these two conditions are met, then the component is serialized using the string at operation 430. Thereafter, at operation 435, the DART agent assembles the architecture based on the connections described in the ADML document. The DART agent then maintains the name-object table in memory, stores the ADML document that is generated based on the current architecture to external storage, and releases all other extra resources at operation 440. Finally, the DART agent activates the main active component designated in the ADML document at operation 445.

Figure 5:
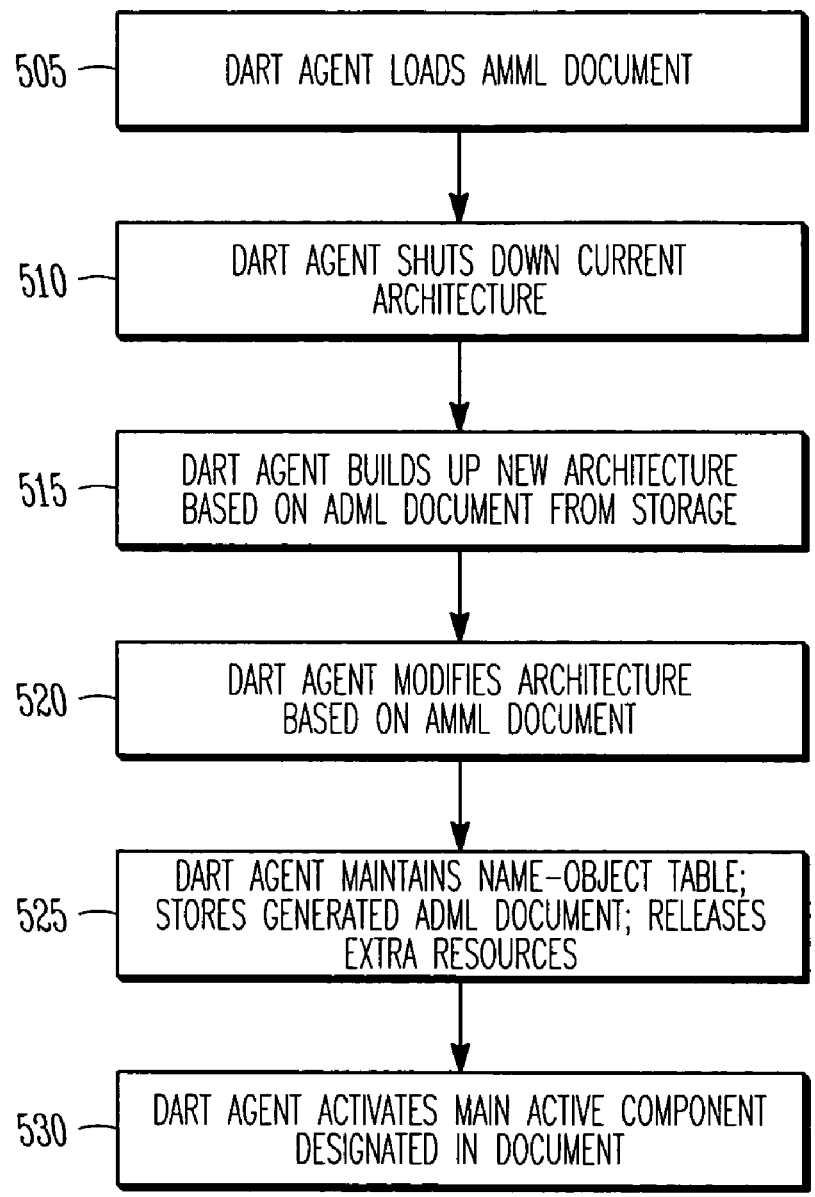
FIG. 5 illustrates an example embodiment of a process to modify a system architecture.

FIG. 5 illustrates an embodiment of a process 500 to modify a system architecture. Referring to FIG. 5, the DART agent loads an AMML document at operation 505. After loading the AMML document, the DART agent shuts down the current architecture at operation 510. After shutdown, the DART agent builds up the new architecture context based on the supplied ADML document (from storage) at operation 515, and at operation 520, the DART agent modifies the architecture based on the AMML document. At operation 525, the DART agent maintains the name-object table in memory, stores the ADML document that is generated based on the current architecture to external storage, and releases all other extra resources. Then, at operation 530, the DART agent activates the main active component designated in the document.

Figure 6:
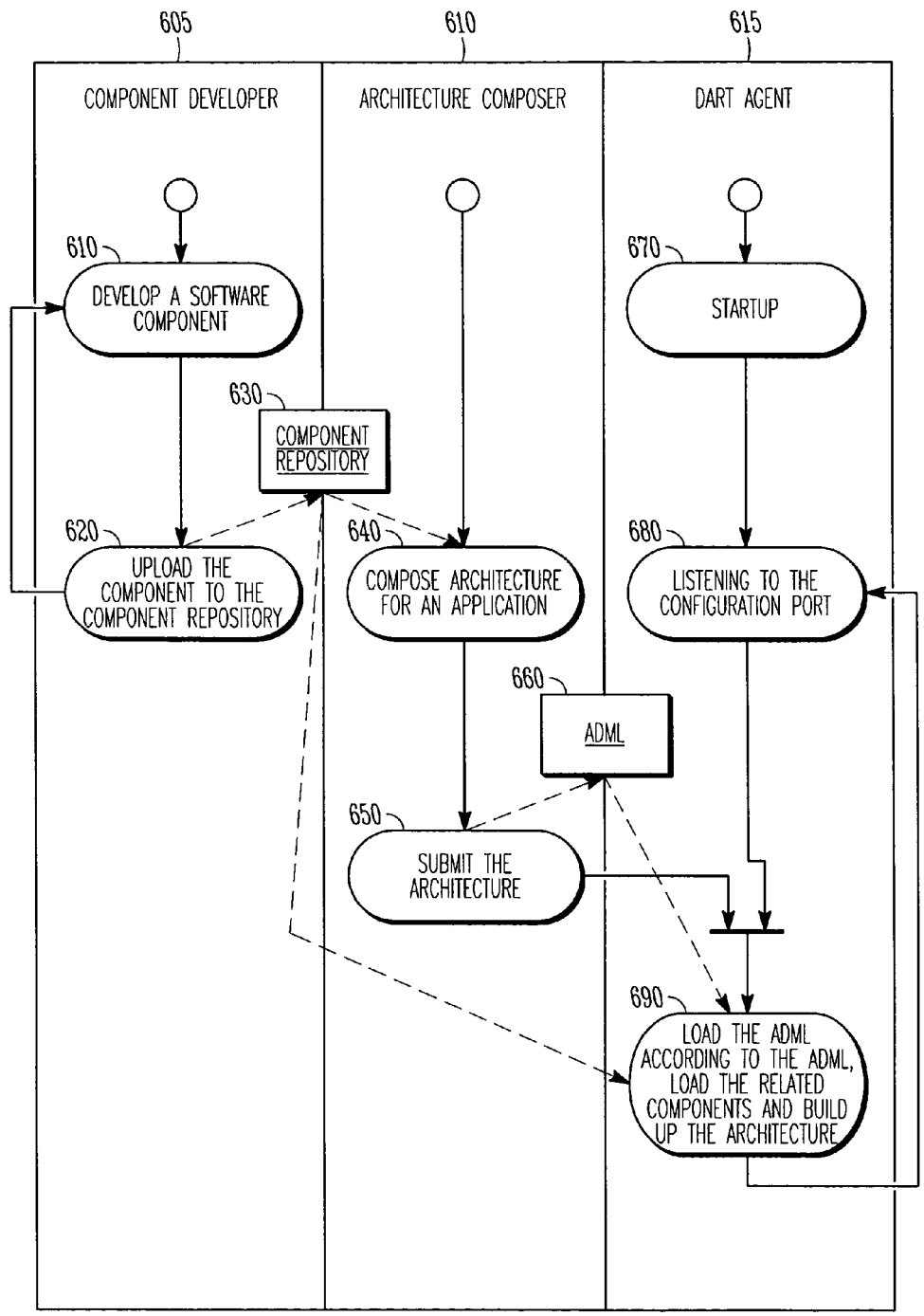
FIG. 6 illustrates an example of a relationship among a component developer, an architecture composer, and a software agent.

FIG. 6 illustrates the relationship and functionality between a component developer 605, an architecture composer 610, and a DART agent 615. A component developer develops a software component at 610. At 620, the component is uploaded into a component repository 630. An architecture composer 610 uses the component repository 630 to compose an architecture for an application at 640, and at operation 650, the architecture is submitted to an ADML 660. A DART agent starts up at 670, and listens to the configuration port at operation 680. The DART agent then uses the ADML 660 and the component repository 630 to load the ADML 660 at operation 690, and according to the ADML, load the related components from the component repository 630 and build up the architecture per the ADML.

Figure 7:
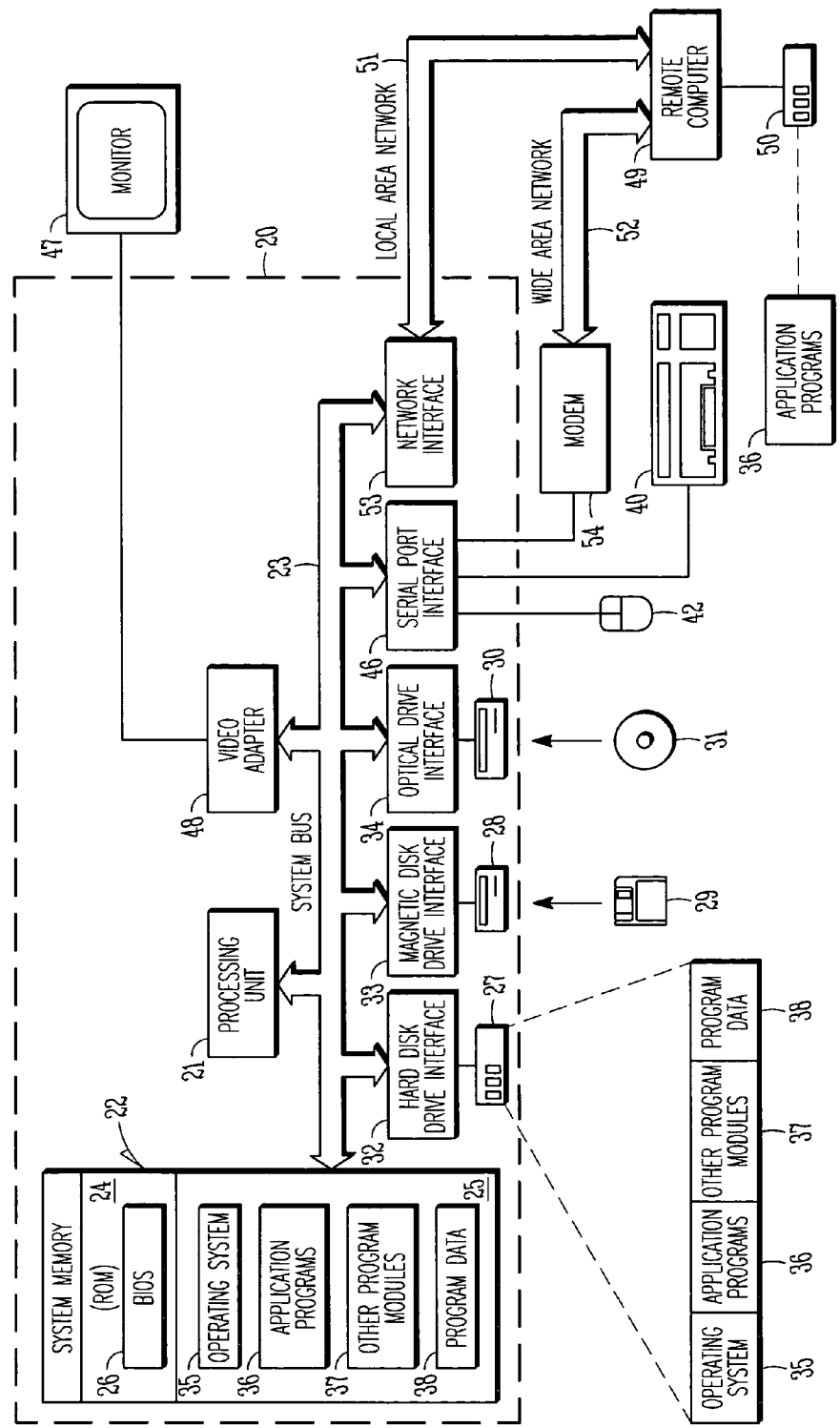
FIG. 7 illustrates an example embodiment of an architecture upon which various embodiments of the disclosure may operate.

FIG. 7 is an overview diagram of a hardware and operating environment in conjunction with which embodiments of the invention may be practiced. The description of FIG. 7 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 7, a hardware and operating environment is provided that is applicable to any of the servers and/or remote clients shown in the other Figures.

As shown in FIG. 7, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 7 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. A process to assemble a software application comprising:
   configuring a processor to load assemblies from an Architecture Description Markup Language (ADML) document;
   configuring said processor to activate class objects and type objects based on said ADML document;
   configuring said processor to create components and connectors based on said ADML document;
   configuring said processor to serialize said components;
   configuring said processor to assemble an architecture based on connections described in said ADML document;
   configuring said processor to activate a main active component designated in said ADML document;
   configuring said processor to determine whether extending string content is defined in a corresponding component markup;
   configuring said processor to determine whether said corresponding component supports serialization by string; and
   configuring said processor to serialize said corresponding component when said string content is defined in said corresponding component markup and said corresponding component supports serialization by string.

2. The process of claim 1, further comprising configuring said processor to maintain a name-object table in a memory.

3. The process of claim 1, further comprising configuring said processor to store said ADML document and to release extra system resources.

4. The process of claim 3, further comprising:
   configuring said processor to load an Architecture Modification Markup Language (AMML) document into memory;
   configuring said processor to shut down a current system architecture;
   configuring said processor to build up a new architecture based on said stored ADML document; and
   configuring said processor to modify said current architecture based on said AMML document.

5. The process of claim 4, further comprising:
   configuring said processor to maintain said name-object table in memory;
   configuring said processor to store said ADML document for said modified current system architecture; and
   configuring said processor to release all extra system resources.

6. The process of claim 5, further comprising configuring said processor to activate a main active component designated in said stored ADML document for said modified current system architecture.

7. A non-transitory machine readable medium comprising instructions to execute a process to:
   load assemblies from an Architecture Description Markup Language (ADML) document;
   activate class objects and type objects based on said ADML document;
   create components and connectors based on said ADML document;
   serialize said components;
   assemble an architecture based on connections described in said ADML document;
   activate a main active component designated in said ADML document;
   determine whether extending string content is defined in a corresponding component markup;
   determine whether said corresponding component supports serialization by string; and
   serialize said corresponding component when said string content is defined in said corresponding component markup and said corresponding component supports serialization by string.

8. The machine readable medium of claim 7, further comprising instructions to maintain a name-object table in a memory.

9. The machine readable medium of claim 7, further comprising instructions to store said ADML document and to release extra system resources.

10. The machine readable medium of claim 9, further comprising instructions to:
    load an Architecture Modification Markup Language (AMML) document into memory;
    shut down a current system architecture;
    build up a new architecture based on said stored ADML document; and
    modify said current architecture based on said AMML document.

11. The machine readable medium of claim 10, further comprising instructions to:
    maintain said name-object table in memory;
    store said ADML document for said modified current system architecture; and
    release all extra system resources.

12. The machine readable medium of claim 11, further comprising instructions to activate a main active component designated in said stored ADML document for said modified current system architecture.

13. A system comprising:
    a computer processor configured to load assemblies from an Architecture Description Markup Language (ADML) document;
    a computer processor configured to activate class objects and type objects based on said ADML document;
    a computer processor configured to create components and connectors based on said ADML document;
    a computer processor configured to serialize said components;
    a computer processor configured to assemble an architecture based on connections described in said ADML document;
    a computer processor configured to activate a main active component designated in said ADML document;
    a computer processor configured to determine whether extending string content is defined in a corresponding component markup;
    a computer processor configured to determine whether said corresponding component supports serialization by string; and
    a computer processor configured to serialize said corresponding component when said string content is defined in said corresponding component markup and said corresponding component supports serialization by string.

14. The system of claim 13, further comprising a module to maintain a name-object table in a memory.

15. The system of claim 13, further comprising a module to store said ADML document and to release extra system resources.

16. The system of claim 15, further comprising:
    a module to load an Architecture Modification Markup Language (AMML) document into memory;
    a module to shut down a current system architecture;
    a module to build up a new architecture based on said stored ADML document; and
    a module to modify said current architecture based on said AMML document.

17. The system of claim 16, further comprising:
    a module to maintain said name-object table in memory;
    a module to store said ADML document for said modified current system architecture;
    a module to release all extra system resources; and
    a module to activate a main active component designated in said stored ADML document for said modified current system architecture.

* * * * *